Aug. 19, 1958  M. R. FENSKE  2,848,503
SEPARATION OF ALCOHOLS FROM HYDROCARBONS
Filed Nov. 23, 1951
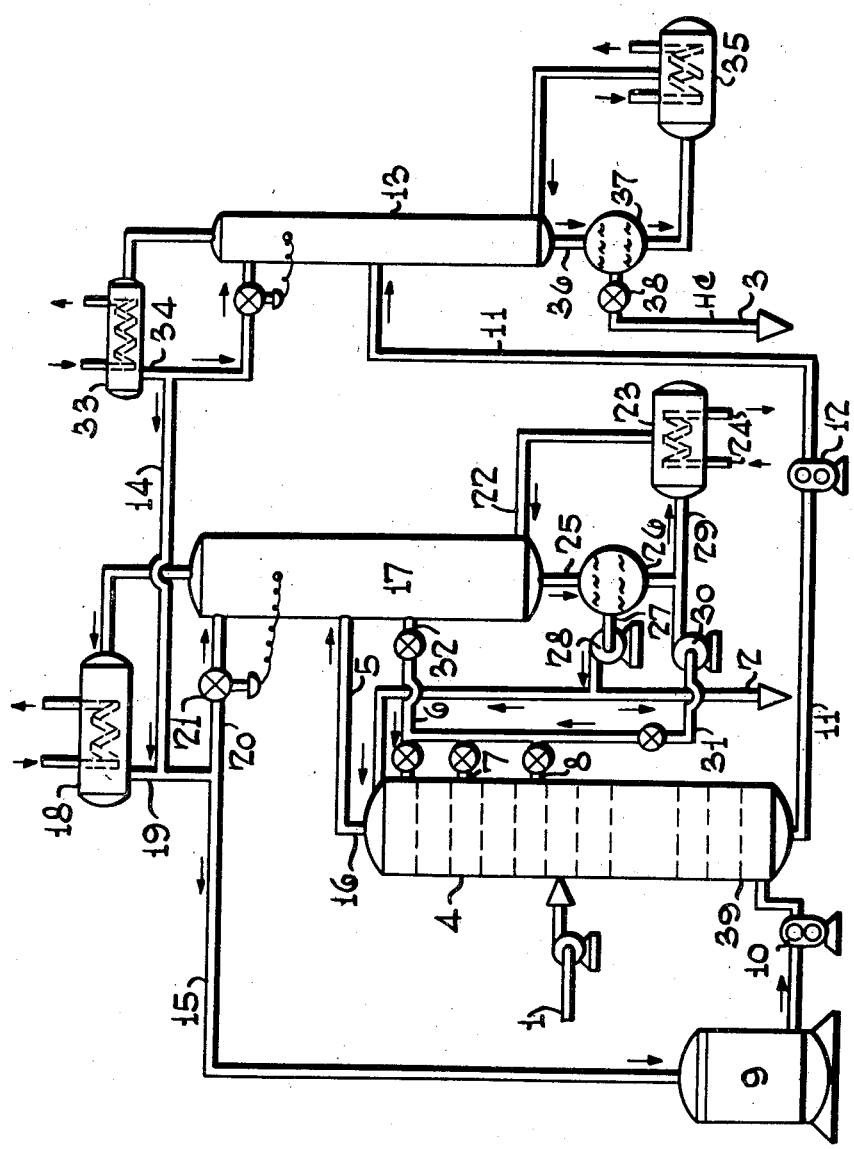
Merrell R. Fenske Inventor
By Henry Berk Attorney United States Patent Office 2,848,503
Patented Aug. 19, 1958

2,848,503

SEPARATION OF ALCOHOLS FROM HYDROCARBONS

Merrell R. Fenske, State College, Pa., assignor to Esso Research and Engineering Company, a corporation of Delaware Application November 23, 1951, Serial No. 257,927

9 Claims. (Cl. 260—643)

This invention relates to the separation of $C_2$ and higher alcohols from mixtures thereof with other organic materials. More particularly this invention relates to the separation of Oxo alcohols from mixtures thereof with other organic materials, predominantly hydrocarbons, including olefins, boiling in approximately the same temperature range.

Various processes for the production of $C_2$ and higher alcohols conventionally result in the production of product mixtures containing other organic materials, usually olefins in nature. In many cases the distillation of the desired alcohol from the crude product gives a distillate of alcohol or alcohols and these organic materials boiling in the same range.

In addition, the high boiling point of these higher alcohols makes their purification by distillation difficult. Separation of the alcohol or alcohols therefrom represents a distinct problem, which has been attacked in many ways.

An example of the obtaining of alcohols with hydrocarbons including olefinic materials boiling in approximately the same temperature range occurs in the well-known Oxo process for the production of primary alcohols (see, e. g., U. S. Patent 2,327,066 and U. S. Bureau of Mines Publication R1 4270, "Critical Review of Chemistry of the Oxo Synthesis, etc.," 1948). The term "Oxo process" is well understood in the art as referring to a process wherein an olefin feed is first reacted or "oxonated" with carbon monoxide and hydrogen at a temperature between 120° and 250° C., and under a pressure of about 150 to 400 atmospheres in the presence of a cobalt or similar catalyst which may be introduced in the form of a fatty acid salt, to form aldehydes in accordance with the following reaction:

$$C_nH_{2n}+H_2+CO \rightarrow C_nH_{2n+1}CHO$$

The aldehydes so formed are then catalytically hydrogenated to form the desired alcohols as follows:

$$C_nH_{2n+1}CHO + H_2 \rightarrow C_nH_{2n+1}CH_2OH$$

The olefinic feed stocks most readily available in large volumes, for the Oxo reaction as outlined above, are selected hydrocarbon streams derived from petroleum refinery sources.

The crude hydrogenated product on vacuum distillation yields an alcohol or alcohols in a mixture therewith of organic materials, largely hydrocarbons including olefins, boiling in approximately the same range.

The present invention provides an improved method for obtaining alcohols in a relatively pure form from the indicated mixtures. The improved method comprises extracting the indicated mixtures with an extracting medium comprising liquid ammonia. The alcohols are preferentially extracted by the ammonia and the hydrocarbons are segregated to the raffinate phase. The ammonia solvent is then removed from the extract phase, leaving the separated alcohol. To this liquid ammonia, one or more modifying solvents may be added to attain the desired solubility control. The term "liquid ammonia solvent" is used to denote liquid ammonia with or without the modifying solvent.

It is surprising to learn that ammonia is so effective in selectively extracting alcohols from hydrocarbons including olefins.

As stated above, this process is ideally adapted for the separation of $C_2$ and higher alcohols in mixtures thereof with hydrocarbons including olefins boiling in approximately the same range. The separation is particularly effective for alcohols in the $C_7$ to $C_{30}$ range, and is especially effective and desirable on the before-mentioned Oxo alcohols in this range, especially those in the $C_{12}$–$C_{20}$ range.

The amount of modifying solvent, or agent, used may vary widely and will depend on general operating conditions and on the feed stock. In general, the solvent mixture will comprise from about 5 to 50 percent of a solvent modifying agent. Suitable modifying solvents are those which will not react to form stable compounds, but which when added to the ammonia will alter its solvent power. Water is an example of a substance for reducing the dissolving power of ammonia for alcohols. These substances are also termed anti-solvents. The lower molecular weight amines, alcohols, ethers and nitriles, such as methylamine, dimethylamine, trimethylamine, methanol, diethyl ether and acetonitrile, are examples of modifying solvents for increasing the dissolving power. In some cases it is advisable to add a modifying solvent to the ammonia to increase its dissolving power for use in the stripping zone of an extractor and when the alcohols and hydrocarbons to be separated boil above about 350° F. Then when this solvent mixture flows into the enriching zone it is frequently advisable to inject water, as hereinafter described, to reduce the dissolving power of the ammonia. Thus, in this case, the solvent contains two substances besides the ammonia, namely, one to increase its dissolving power (usually employed in the stripping section) and one to reduce its dissolving power (usually employed in the enriching section).

The amount of modifying solvent added depends upon the degree to which the solvent power should be changed, and hence upon the mixture being extracted, the extraction temperature, and the particular modifying solvent used. Water is very effective as an anti-solvent and, in general, is used in concentrations between about 2 and about 20 percent. Mono-, di- and tri-methylamine, which may be represented by the formula

wherein $R_1$ and $R_2$ are substituents selected from the class consisting of hydrogen and methyl groups, constitute especially good modifying solvents to increase the dissolving power and usually comprise from 10 to 50 or more percent of the ammonia. The main criterion for judging the amount or proportion of modifying solvent to employ is that it should control the dissolving power of the ammonia so the concentration of solute in the ammonia solvent is within the range of about 10 to about 25 percent at the extraction temperatures employed. These are usually from about 50° F. to about 150° F. The term "solute" denotes the total amount of material in solution in the ammonia, whether it be alcohol, or hydrocarbon, or mixtures of these two.

In addition to the dissolving capacity of the solvent, which determines among other things how much solvent is needed to produce a given amount of alcohol, there is the solvent's selectivity. The selectivity is a measure of how sharp the separation is between alcohol and hydrocarbon in a single stage. In general, the selectivity shows how many stages, or their equivalent, are needed to produce a given alcohol purity and yield.

To give precise expression to the solvent's selectivity, the term "beta" is used. This term is analogous to alpha employed in distillation. It is represented by the following formula:

$$\text{Beta} = \frac{A_e}{H_e} \times \frac{H_r}{A_r}$$

Here the terms $A_e$ and $A_r$ are used to denote the equilibrium concentration of alcohol in the extract and raffinate phases, respectively. Similarly, $H_e$ and $H_r$ are the equilibrium concentrations of the hydrocarbon, respectively, in the same extract and raffinate phases. Thus the ratios $A_e/H_e$ and $H_r/A_r$ denote the ratio of alcohol to hydrocarbon concentrations at equilibrium in the extract and raffinate phases, respectively. Beta is an exact concept and can be used directly to determine the number of extraction stages needed (see article in Ind. Eng. Chem. 29, 270, 1937, by Varteressian and Fenske).

the stripping section of an extractor, the temperatures in this section are apt to be high (to obtain adequate solubilities). Consequently, the pressures will also have to be high to maintain the liquid phase. The use of extraction temperatures much above about 160° F. can be avoided if a modifying solvent is used with the ammonia to increase the dissolving power. These modifying solvents and their use, of which methylamine is an example, are described elsewhere in this specification.

It has been found that ammonia has a remarkable affinity for compounds containing the hydroxyl group. Even aromatic hydrocarbons, which are known to be readily soluble in ammonia, have miscibility temperatures in ammonia about 60° to 100° F. higher than an alcohol of the same boiling point.

If the polarity of a compound containing a hydroxyl group is increased by the presence of double bonds or unsaturation, or ether linkages in the molecule, the affinity of ammonia for such substances is markedly increased. For example, furfuryl alcohol is soluble at −32° F. in a mixture of 40 parts of ammonia and 60 parts of water.

*Table 1*

A.—MISCIBILITY TEMPERATURES

| Formula | Alcohol Structure | Boil Pt., °C. | Miscibility Temp., °F. With 100% NH₃ | Miscibility Temp., °F. With— | | |
|---|---|---|---|---|---|---|
| | | | | 91 Wt. Percent NH₃ + 9 Wt. Percent H₂O | 80 Wt. Percent NH₃, 20 Wt. Percent H₂O | 65 Wt. Percent NH₃, 35 Wt. Percent H₂O |
| $C_6H_{13}OH$ | Hexanol-1 | 157 | | 5 | | 135 |
| $C_8H_{15}OH$ | 2,4-Dimethyl Cyclohexanol | 186 | Below −35° F | −20 | | |
| $C_8H_9OH$ | Phenyl Ethyl Alcohol | 220 | | | Below −25° | 92 |
| $C_9H_{19}OH$ | Nonanol-5 | 201 | Below 0° F | 58 | | |
| $C_9H_{19}OH$ | 2,5-Dimethyl Heptanol-5 | 181 | Below 0° F | 67 | | |
| $C_9H_{19}OH$ | 2,4,4-Trimethyl Hexanol-3 | 179 | Below 0° F | 52 | | |
| $C_{10}H_{17}OH$ | Terpineol | 220 | | 103 | | |
| $C_{10}H_{21}OH$ | 2-Butyl Octanol-1 | 252 | | 116 | | |
| $C_{11}H_{23}OH$ | 5-Ethyl Nonanol-2 | 225 | Ca. −25 | Ca. 71 | | |
| $C_{12}H_{25}OH$ | 2,6,8-Trimethyl Nonanol-4 | 225 | 35 | 122 | | |
| $C_{14}H_{29}OH$ | 7-Ethyl-2 Methyl Undecanol-4 | 264 | 82 | | | |
| $C_{17}H_{35}OH$ | 3,9-Diethyl Tridecanol-6 | 315 | 115 | | | |

EXAMPLE 1

Table 1 shows the miscibility temperatures for various alcohols in liquid ammonia and in ammonia containing some water. These miscibility temperatures are the point where a 45 to 55 weight percent mixture of the alcohol and solvent become completely miscible, i. e., exist only as one liquid phase instead of as two partly miscible liquids. In order for the solvent to be able to separate an alcohol in 90+% purity from a mixture with hydrocarbons by liquid extraction, it usually is necessary that the alcohol be incompletely miscible with the solvent. More particularly this controlled or limited solubility, according to the present invention, shall be within the range from about 10 to 35 percent solubility in the solvent. In other words, the present invention requires the particular solvent or mixture of solvents used to form a saturated solution when about 10 to 35 percent of solute is dissolved therein at the extraction temperature employed.

Table 1 shows that it would not be usually economical to use temperature alone to obtain partial miscibility for many of the alcohols using pure ammonia as the solvent, because extensive refrigeration would be needed to produce two liquid phases. However, as this table demonstrates, the addition of about 9% water raises the miscibility temperatures to practical levels. Olefinic hydrocarbons, of about the same boiling point of these alcohols, have miscibility temperatures from about 100° to 150° F. higher than those for the alcohols. This shows that ammonia is a selective solvent, but it also shows that unless something is done to increase the solubility in

B.—EFFECT OF WATER ON MISCIBILITY TEMPERATURE OF 5-ETHYL NONANOL-2

| Wt. percent H₂O in NH₃: | Misc. temp., ° F. |
|---|---|
| 0 | Ca. −25 |
| 6 | +53 |
| 9 | +71 |
| 16 | +126 |
| 30 | Above +130 |

EXAMPLE 2

Lauryl alcohol and tetradecene are two substances boiling very close together and they are not separable by fractional distillation. In 100% liquid ammonia lauryl alcohol is completely miscible (soluble) at temperatures above about 50° F. Even at 120° F. tetradecene is only 6 weight percent soluble in liquid ammonia. In a solvent mixture composed of 46 weight percent ammonia and 54 weight percent monomethylamine the miscibility temperature for lauryl alcohol is about +35° F. Over the solubility range of 10 to 25%, beta for the separation of lauryl alcohol from tetradecene ranges from about 2 to 4. Using a fifteen-stage liquid extractor a feed mixture of 25% lauryl alcohol and 75% tetradecene is separable into an extract consisting of alcohol of 95% purity, and a raffinate consisting of tetradecene also in 95% purity. Ten stages are in the enriching section and 5 are in the stripping section. Five to six pounds of solvent consisting of liquid ammonia containing about 25 to 35% methylamine are used for the extraction per pound of feed mixture. The temperatures, methyl amine and water contents, of the solvent are controlled so that the solubility in the extractor is in the range of about 10 to 25%. In the enriching section of the extractor, and especially near the end where the solvent is richest in alcohol, water is injected into the solvent, as hereinafter described. The total amount of water so injected ranges from about 5 to 10% of the solvent. The temperatures in the extractor range from about 70° to 125° F. and the pressure held at 350 p. s. i.

EXAMPLE 3

Dodecene-1 and 5-ethyl nonanol-2 are two substances boiling close together. They are not easily separated by distillation. The following data, using liquid ammonia as the solvent, show the selectivity in terms of beta for a mixture containing 47% alcohol and 53% olefin. Beta has already been described. It expresses the ratio of alcohol to olefin in the extract phase divided by this same ratio for the raffinate phase, at equilibrium. The solubility is the amount of alcohol plus olefin in the ammonia phase, expressed as weight percent.

| Temp., °F. | Solubility | Beta |
|---|---|---|
| 112 | 32 | 2.5 |
| 99 | 26 | 3 to 4 |
| 78 | 18 | 5 to 7 |

These data demonstrate the remarkable ability of ammonia to dissolve preferentially the alcohol. They also show the importance of solubility control, for beta decreases rapidly as the solubility increases.

EXAMPLE 4

This illustrates that the mixture containing alcohols and hydrocarbons does not have to be narrow boiling to be separable by the process of this invention. An alcohol-hydrocarbon feed mixture, containing olefinic and saturated homologs, and about 50% alcohols, and boiling from about 200° to 300° C., is separable in a 20 theoretical stage liquid extractor using these ammonia solvents into an extract containing 95% alcohols and a raffinate containing about 5% alcohols using about 9 pounds of ammonia solvent per pound of feed mixture. In the stripping zone of the extractor the ammonia contained from about 30 to 45% methylamine; in the enriching zone, especially near the extract end, the ammonia solvent contained from 2 to 8% water. The temperatures in the extractor are in the range of 60° to 125° F. Sufficient pressure is used to confine the solvent to the liquid phase; namely about 300 p. s. i. The extraction procedure is described in Figure 1. This feed is illustrative of an alcohol-hydrocarbon mixture from the Oxo process.

The pure alcohols, which comprise the extract, can now be fractionally distilled into the various molecular weight types without complications from hydrocarbon contamination.

If there is hydrocarbon contamination in the alcohols produced by the process of this invention, these hydrocarbons are in the lowest boiling part of the alcohol mixture or alcoholic extract. Thus, removing the first 10 to 20% of the alcoholic extract by distillation is a very good way to increase the purity, or alcoholic content, of the distillation residue. The distillate, since it is now a narrower boiling portion than the original feed, can then be reextracted, and sharply separated into alcoholic and non-alcoholic portions.

In general, if the hydrocarbons present in a feed for extraction by the present invention are in the higher boiling portions of the feed, the purity of the alcohols will be greatest.

The narrower the boiling range of the feed, the easier is the extraction. The hydrocarbons associated with the alcohols may comprise any of the common structures, such as aromatic, olefinic, naphthenic, paraffinic, or terpenic types.

A flow diagram for carrying out this process is shown in the attached Figure 1. The alcohol-hydrocarbon mixture to be separated enters via line 1. The alcohols leave through line 2, and the hydrocarbons through line 3.

The extraction unit 4, wherein the separation occurs, may be a tower or a mixer-settler type of extractor. In any case it has the equivalent of at least 10 theoretical extraction stages, and it is equipped so that temperature gradients can be established within the extraction zone, with the highest temperatures at the lower part of the extraction zone and the lowest temperatures in the upper part. These temperature gradients can be established by coils or heat exchangers (not shown) within the tower 4 through which steam or cold water flow. Usually a temperature gradient of 50° to 100° F. is employed. Three other features of the extractor are important besides temperature gradients. These are: (a) provision for the injection of controlled amounts of an anti-solvent, such as water, (b) the division of the extractor into stripping and enriching zones, characterized by their location with respect to the feed point 1, and (c) provision for returning an extract reflux stream via line 5.

Another novel feature is the manner in which the anti-solvent, water, is regenerated for reuse and the role that this water (as steam) plays in stripping, or freeing, the alcohols and hydrocarbons from solvent. This steam stripping in the recovery system is advantageous also in decomposing any ammonia-oxy compound complexes, such as aldehyde- or keto-ammonia compounds, ammonium salts, and amides, that might be formed in small amounts due to the presence of such oxygenated materials in the feed stream.

The use of multi-point injection of anti-solvent, such as liquid water, is important and essential, if the alcohols are to be of high purity with respect to being free of hydrocarbons. These anti-solvent injection points are in the enriching zone, namely that part of the extraction path located between the point where the feed enters, and the solvent, or extract phase, leaves the extractor.

As an illustration of the manner of carrying out the process of this invention, solvent from storage tank 9, flows into the base of extractor 4, via metering pump 10. The solvent in this example comprises liquid ammonia plus a modifying solvent which is used as already described. In extractor 4 the solvent or extract phase flows upward while it extracts or scrubs countercurrently the downward flowing hydrocarbon-alcohol mixture. The part of the extractor between feed point 1 and solvent entry point 39 functions as a stripping zone. That is, in this portion of the extractor, the alcohols are stripped, or removed by countercurrent extraction with the solvent, from the hydrocarbons with which they were originally associated in the feed.

This hydrocarbon phase, called the raffinate phase since it contains hydrocarbons plus 10 to 25% of solvent, leaves the extractor via line 11 and metering pump 12. It then flows into raffinate stripping column 13, where by means of distillation and open stream stripping the solvent is distilled overhead and removed via lines 14 and 15 to return to storage tank 9. The hydrocarbon freed of solvent leaves by means of line 3.

The stripping zone is an important part of the process, for the extractions occurring here determine the yield of alcohols in the extract portion. Obviously, if the extraction is such that no alcohol is in the raffinate phase in line 11, the alcohol yield from the process is 100%.

The solvent or extract phase leaving the stripping zone has in it alcohols and hydrocarbons, with the former in higher ratio to the latter than in the feed. From this zone it continues its upward flow into the enriching zone, which is characterized by the portion of the extractor between the point of feed entry (via line 1) and that where the extract or solvent phase leaves the extractor, via line 16.

It is the function of the enriching zone to enrich, or purify, the alcohols so that the solute, or material dissolved in the solvent phase leaving line 16, is of the required alcohol purity. This may approach 100% purity.

In this enriching zone the hydrocarbons dissolved in the solvent along with some of the alcohols, are taken out of solution and returned to the stripping zone as a hydrocarbon enriched raffinate phase. The separate liquid phase used to scrub the extract or solvent phase in the enriching zone is called a reflux phase.

There are three methods by which this reflux phase in the enriching zone is created. First, the enriching zone usually operates at a lower temperature than the stripping zone. Cooling the saturated solvent produces another phase, richer in hydrocarbon than that remaining in the solvent. Second, injection of an anti-solvent at points 6, 7, and 8 throws a hydrocarbon enriched phase out of solution. Third, extract in line 5, i. e., material originally in solution in the solvent in line 16, can be returned to the top of the extractor to comprise the reflux phase. This is a very good way to obtain a reflux phase, provided the dissolving power of the solvent, as it approaches line 16, is carefully controlled so the reflux returned via line 5 is incompletely miscible in the solvent. Furthermore, the solubility of this reflux in pure solvent, under the extraction conditions prevailing in tower 4, shall be controlled (by temperature reduction or anti-solvent, or both) so as to be in the range of about 10 to 25 weight percent.

Depending on the number of theoretical extraction stages (or their equivalent) in the enriching zone of extractor 4, and the ratio of the reflux phase to the solvent phase in this zone, the solvent phase can be enriched in alcohols to any desired purity, approaching 100%. The more the extraction stages and the higher the reflux ratio, the higher the alcohol purity. Thus it is evident that the purpose and function of the enriching zone is to attain, or control, alcohol purity. This zone works in conjunction with the stripping zone, whose function is to control the alcohol yield.

The extract or solvent phase flowing in line 16 is separated in tower 17 into solvent and extracted materials, which are the alcohols.

Tower 17 is a fractional distillation column operating under sufficient pressure that the solvent vapors can be condensed to liquid in condenser 18 by ordinary cooling water. This pressure is usually in the range of 150 to 250 p. s. i. Some of the condensed, or liquid solvent, flowing out of condenser 18 via line 19, flows through line 20 and control valve 21 into top of distillation tower 17 as a reflux liquid. This reflux is pure solvent and its use in the enriching section of tower 17 prevents extracted material (alcohols) from distilling overhead along with solvent. The amount of solvent returned to tower 17 as reflux condensate is controlled by valve 21. This value is actuated, in conventional ways, by a temperature control point in tower 17. If the temperature at the control point in tower 17 rises above a predetermined value, valve 21 opens more, and more reflux is returned via line 20 in proportion to solvent flowing back to storage tank 9 from condenser 18. This increased reflux flow, or reflux ratio, washes the high boiling materials, that caused the temperature control point to rise in temperature, back down tower 17. Since normally there is a wide difference in boiling point between the ammonia solvent and the alcohols in tower 17, it is easy to effect their separation, if the proper controls, as indicated, are employed on tower 17.

Steam at the pressure existing in tower 17 is blown into the base of tower 17 to strip the solvent from the alcohols. This can be steam from a refinery supply line, or it can be generated in reboiler 23, by boiling water by means of heating coils 24. This steam gives up its heat, thereby condensing to water, by vaporizing the solvent that flows into tower 17 via line 16.

This water together with the extract product (alcohols) flow down through the tower 17 and leave through line 25. From here they flow into settler 26 which may or may not be cooled. If the alcohols having above 8 carbon atoms and higher are being extracted, these are incompletely miscible with the water even at about 400° F. For example, octanol-1 is soluble in water to the extent of only about 0.5 weight percent at 400° F. Higher alcohols are less soluble. If the solubility of lower molecular weight alcohols is too high in the water in separator 26, then cooling is done in this separator to produce a liquid alcohol phase and a liquid water phase. This alcohol phase is drawn off in line 27 via metering pump 28 to leave the process via line 2. If there is too much water in the alcohol, this can be subsequently removed by further cooling to effect the separation of a water phase, or by distillation.

The heavy phase, or water layer, in 26 is connected to reboiler 23 so this phase can be returned via line 29. Steam is generated in reboiler 23 and passed via line 22 to tower 17. Part of this aqueous phase passes through pump 30 and line 31 to serve as anti-solvent in tower 4. This anti-solvent is injected, preferably at more than one point, such as, for example, via lines 6, 7, and 8. It is important to use the proper amount of this water as the anti-solvent. The proportion of anti-solvent with respect to the ammonia solvent, and the injection points are selected so that the concentration of solute in the ammonia solvent is between 10 and about 25% by weight. This solute is essentially alcohols near the top of tower 4, such as in the vicinity of lines 5 and 6. Farther down the tower, such as at injection point 8, alcohols and hydrocarbons together comprise the solute. At point 8 the water injected may be about 2 to 5% of the ammonia solvent, whereas at point 6 the concentration may be 10 to 15%. The higher the alcohol content in the ammonia solvent, the higher must be the proportion of water in the solvent to restrict the solubility of the solute so as to be within the limits of about 10 to about 25%.

It is easy and straightforward to determine if these solubility limits prevail in tower 4. All that is necessary is to withdraw a sample of the solvent phase at a selected point in tower 4, and determine the amount of solute associated with a given amount of solvent. This can be done easily by evaporating off the solvent (to arrive at the amount of solute), or by adding an aqueous acidic solution in which the ammonia solvent, but not the solute, is soluble. If the solute concentration is too high, more water needs to be added at or near the withdrawal point. If it is too low, i. e., below about 10%, then less water should be injected.

If only one phase, such as an alcohol phase, exists in separator 26, then the water phase, for use as anti-solvent in tower 4, can be withdrawn from an intermediate point or plate in tower 17, such as via line 32. This aqueous anti-solvent can then be injected, as needed, via lines 6, 7, or 8 in the usual way.

The raffinate phase, consisting, for the most part, of the hydrocarbons originally present with the alcohols in feed stream 1, leaves extractor 4 via line 11 and metering pump 12. Since there is usually from about 5 to 20% solvent in this raffinate stream, the elimination of this solvent is accomplished in tower 13. This is a distillation tower operating in the same manner as tower 17. The solvent is distilled overhead and condensed in condenser 33. It then flows back to solvent storage tank 9 via lines 34, 14 and 15. Open steam is used in tower 13 to expel the solvent in the same manner as in distillation tower 17. This steam may be generated in reboiler 35.

Liquid hydrocarbon and water leave the base of distillation tower 13 via line 36 and flow into separator 37, which may or may not be cooled. Here the lighter hydrocarbon phase is separated from the water. This hydrocarbon phase is removed via valve 38. From here it flows out through line 3 to storage.

In addition to the manner of solubility control in the enriching section of the extractor, another important feature of this invention resides in the manner of solubility control at the feed point and in the stripping section. It is now evident that to remove alcohols, such as those of 8 carbon atoms and more from hydrocarbons, that an extremely wide range in solubility would prevail in the extractor. The alcohols are much more soluble than the hydrocarbons in liquid ammonia, but this solubility difference is not complete in the sense that one is dissolved without the other, as in the case of sugar, sand, and water. Solubility control in the enriching section can be accomplished by using an anti-solvent, such as water, and/or temperature reduction. These methods operate usually to reduce, or hold down, the solubility of the alcohols in the ammonia solvent.

In the stripping section of the extractor opposite effects must be produced. The problem here is usually one of bringing the solute concentration in the ammonia solvent up to the preferred concentration range of 10 to about 25% solubility.

The use of a solubilizing agent, such as methylamine, with or without an elevation in temperature, is a very suitable way to attain the desired solubility control at the feed point and in the stripping section of the extractor. Operation with this improvement is as follows. Enough methylamine is added to the ammonia in feed tank 9 so that the solubility of the feed (or alcohol-hydrocarbon mixture to be separated) is within the range of 10 to about 25 weight percent at extraction temperatures prevailing at the alcohol-hydrocarbon feed point. These are usually around 80° to 100° F. The temperature at the point of entry of this solvent mixture into the extractor may be higher, such as 100° to 140° F. It will be found that as indicated, and employing temperature patterns, as mentioned, that complete solubility control is obtained in the stripping section. Since water is completely miscible with the ammonia-methylamine solvent mixture, it is injected in the usual way to obtain solubility control in the enriching section.

In carrying out the extraction process described, the temperatures in extractor 4 usually range from 50° to 100° F. at the top and 100° to 150° F. at the bottom. The pressure is such as to confine the solvent at these temperatures to the liquid phase. These pressures are usually from about 200 to 350 p. s. i. In the solvent recovery towers 13 and 17 the temperature at the top is usually around 100° F. and that at the bottom, or in reboilers 23 and 35, about 400° F. The pressures on these towers is such as to condense the solvent using ordinary cooling water; they are usually in the range of 150 to 250 p. s. i.

The feed, or alcohol-hydrocarbon mixture to be extracted, may be narrow boiling or wide boiling, such as 100° to 200° F., or more. The hydrocarbons usually comprise the unsaturated (olefinic) and saturated types of both chain and ring (naphthenes) structures. Usually aromatics are not present but they can be in the feed and not jeopardize the process. The process is especially adapted for the separation of alcohols from hydrocarbons boiling in the range of 150°–350° C.

The alcohols may be of simple type such as the normal or simply branched alcohols. However, other structures such as cyclic or unsaturated alcohols, simple or alkyl phenyl carbinols, glycols, ether-alcohol types, terpineols, and carbinols containing furan or tetrahydro furan groups, may be separated from hydrocarbons by this process. In general, this process can be used to separate oxy-compounds from hydrocarbons of similar molecular weight so long as the oxy-compounds do not form stable compounds with the ammonia solvent under the extraction or solvent recovery conditions herein described.

The following definitions relate to the claims and the preceding specification.

The hydroxyl groups may be attached to chain or ring type structures. In the latter instance they comprise a class of substances known as phenols, when the ring structure is aromatic in character. In the case of the first members of this series, namely the simple phenols or phenol itself, there are loose compounds formed with the ammonia solvent. These can be decomposed back to ammonia and the phenol under the conditions described for the recovery of the ammonia solvent. Particularly these conditions include temperatures in the range of 300° to 450° F. under hydrolysis conditions where the water is present as a liquid or vapor phase, or both. The tendency to form loose compounds is much less with the higher phenols, xylenols, naphthols, and dihydroxyl compounds such as resorcinol and its alkylated derivatives. In these cases, solution in the ammonia solvent is more nearly the conventional type. Ammonia solvents are selective for removing these phenolic substances from hydrocarbons with which they may be associated in the oils from the low temperature carbonization of coal, lignite and shales, and also in the oils formed by the first liquefaction step in the hydrogenation of coal.

"A predominant proportion of liquid ammonia" is liquid ammonia together with any modifying solvent such that the ammonia contributes primarily to the solvent's selectivity, as illustrated in the preceding examples.

"Ammonia solvent" means liquid ammonia together with modifying solvent.

By "modifying solvent" is meant any liquid which when added to the system will alter the solvent power of the solvent. The modifying solvent may or may not be a selective solvent, it's determining characteristic being only that it will change the dissolving capacity of the liquid ammonia.

It will be understood that the foregoing examples and illustrations have been given merely for purposes of illustration. Other modifications of the present invention are possible without departing from the scope of the appended claims.

What is claimed is:

1. A process for separating $C_7$ to $C_{30}$ alcohols having 1 to 2 hydroxyl groups per molecule from a liquid feed mixture thereof with hydrocarbons having a similar boiling range as said alcohols, said mixture boiling between about 150° and 350° C., which comprises feeding said liquid mixture into an intermediate portion of an extraction zone having a multiplicity of extraction stages, introducing a liquid ammonia solvent containing 10 to 50% methylamine into a lower portion of said extraction zone and passing it upwardly therethrough, maintaining the extraction zone at a temperature between about 50° and 150° F. and at a pressure sufficient to maintain the solven in liquid phase, injecting water into the extraction zone above the feed inlet in a proportion of about 2 to 20 weight percent based on the ammonia solvent so as to maintain the solubility of the mixture of alcohols and hydrocarbons in the solvent at about 10 to 25 weight percent throughout the extraction zone, withdrawing an extract stream enriched in alcohols from the top portion of said extraction zone, and withdrawing a hydrocarbon raffinate stream from the bottom portion of the extraction zone.

2. A process according to claim 1 which comprises stripping said withdrawn extract stream with steam at temperatures of about 300° to 450° F. until the extract is freed of ammonia solvent.

3. A process for extracting $C_7$ to $C_{20}$ alcohols from an alcohol-hydrocarbon mixture boiling from about 150° to 300° C. and containing said alcohols admixed with olefin-containing hydrocarbons that boil in a similar boiling range as said alcohols, which comprises feeding said mixture into an intermediate portion of an extraction zone having an enriching section above said intermediate portion and a stripping section therebelow, introducing a solvent containing liquid ammonia and 5 to 50% of a solvent modifying agent selected from the group consisting of methyl alcohol, diethyl ether, acetonitrile and amines having the formula

wherein $R_1$ and $R_2$ are substituents of the group consisting of hydrogen and methyl radicals into a lower portion of said stripping section and passing it upwardly through said extraction zone, maintaining said extraction zone at a temperature between about 50 to 150° F. and at a pressure of at least 200 p. s. i. and sufficient to maintain the ammonia in liquid phase, reducing the extraction temperature in the direction of solvent flow so as to maintain a temperature gradient of 50° to 100° F. between the bottom and top of the extraction zone in order to control the concentration of alcohols and hydrocarbons dissolved in said solvent within the range of about 10 to 25 weight percent throughout the extraction zone, recovering an enriched alcohol extract from the upper portion of said enriching section, and removing a concentrated hydrocarbon raffinate from the lower portion of said stripping section.

4. A process according to claim 3 wherein the alcohol-hydrocarbon mixture consists essentially of lauryl alcohol and tetradecene.

5. A process according to claim 3 wherein the alcohol-hydrocarbon mixture comprises $C_{12}$ to $C_{30}$ Oxo alcohols admixed with approximately an equal amount of hydrocarbons and is produced in a two-stage oxonation and hydrogenation process of olefin-containing hydrocarbons boiling in approximately the same temperature range as the said Oxo alcohols.

6. A process according to claim 3 wherein the dissolving power of the solvent in the enriching section is maintained substantially constant by injecting into the enriching section about 2 to 20 percent of water based on the ammonia solvent.

7. A process according to claim 3 wherein the ammonia solvent in the stripping section contains about 30 to 45 percent methylamine, and water is injected into the enriching section at a plurality of successive levels in a ratio of about 2 to 15 percent based on the ammonia solvent present.

8. An extraction process according to claim 7 which further comprises the steps of passing the saturated alcohol extract from the extraction zone to an intermediate portion of a distillation zone, distilling off solvent therein at a pressure of at least 150 p. s. i., condensing the resulting solvent vapors by indirect heat exchange with cooling water, returning the condensed solvent to the extraction zone, passing a liquid alcohol-water mixture from the bottom of said distillation zone to a separation zone, maintaining said separation zone at a temperature low enough to cause separation of said alcohol-water mixture into a water phase and an alcohol phase, returning a portion of said separated water phase to the said enriching section to serve as anti-solvent therein, reboiling another portion of the separated water phase, returning the resulting water vapor to the bottom portion of said distillation zone to supply heat thereto and to strip ammonia compounds therefrom, returning a portion of the separated alcohol phase to the top of the enriching section of the extraction zone, and recovering the remainder of the separated alcohol phase.

9. In combination with process according to claim 3, the improvement of further purifying the alcohols which comprises distilling the recovered alcohol extract to separate solvent from the alcohols, further distilling the first 10 to 20% of the alcohols, and re-extracting the remaining alcohols with an ammonia solvent to separate hydrocarbon contaminants therefrom.

References Cited in the file of this patent

UNITED STATES PATENTS

| 2,016,633 | Gieseler | Oct. 8, 1935 |
| 2,081,721 | Van Dijck | May 25, 1937 |
| 2,535,069 | Johnson | Dec. 26, 1950 |
| 2,539,393 | Arnold et al. | Jan. 30, 1951 |

FOREIGN PATENTS

| 596,091 | Germany | Apr. 26, 1934 |